(12) United States Patent
Carrasco et al.

(10) Patent No.: US 10,135,316 B2
(45) Date of Patent: Nov. 20, 2018

(54) STATOR ASSEMBLY AND MAGNETIC BEARING OR ELECTRIC MOTOR HAVING SUCH A STATOR ASSEMBLY

(71) Applicants: Eduardo Carrasco, Saint Etienne sous Bailleul (FR); Eddy Herisse, les Andelys (FR)

(72) Inventors: Eduardo Carrasco, Saint Etienne sous Bailleul (FR); Eddy Herisse, les Andelys (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 329 days.

(21) Appl. No.: 15/074,693

(22) Filed: Mar. 18, 2016

(65) Prior Publication Data

US 2016/0285342 A1    Sep. 29, 2016

(30) Foreign Application Priority Data

Mar. 26, 2015    (EP) .................................... 15305446

(51) Int. Cl.
| | |
|---|---|
| *H02K 7/09* | (2006.01) |
| *H02K 1/18* | (2006.01) |
| *H02K 5/04* | (2006.01) |
| *H02K 15/02* | (2006.01) |
| *H02K 1/12* | (2006.01) |

(52) U.S. Cl.
CPC ................. *H02K 7/09* (2013.01); *H02K 1/12* (2013.01); *H02K 1/185* (2013.01); *H02K 5/04* (2013.01); *H02K 15/028* (2013.01)

(58) Field of Classification Search
CPC ....................................................... H02K 7/09
See application file for complete search history.

(56) References Cited

U.S. PATENT DOCUMENTS

| | | | |
|---|---|---|---|
| 8,823,239 B2* | 9/2014 | Ossenkopp | H02K 1/28 310/216.004 |
| 9,496,770 B2* | 11/2016 | Grillenberger | H02K 1/20 |
| 9,917,500 B2* | 3/2018 | Fleck | H02K 55/00 |
| 2004/0217669 A1* | 11/2004 | Fujii | H02K 1/148 310/216.045 |

(Continued)

FOREIGN PATENT DOCUMENTS

DE        10332958 A1    2/2005

*Primary Examiner* — Robert W Horn
(74) *Attorney, Agent, or Firm* — Bryan Peckjian; SKF USA Inc. Patent Dept.

(57) ABSTRACT

A stator assembly that provides a concentric housing and stator, the stator radially positioned inside the housing, the housing having an inner surface, the stator having an outer surface radially facing the inner surface. One of the outer surface of the stator and the inner surface of the housing has recessed shapes and the other one of the outer and inner surface has protruding shapes. When the two shapes are arranged in a first relative position, the protruding shapes are inserted in the recessed shapes so that the stator can be mounted radially inside the housing along a central axis of the assembly, and in a second relative position that is angularly shifted relative to the first position around the central axis, the protruding shapes exert, against the one of the housing and the stator that bears the recessed shapes, a radial force that angularly and axially locks the stator.

13 Claims, 6 Drawing Sheets

(56) References Cited

U.S. PATENT DOCUMENTS

2010/0187944 A1\* 7/2010 Ossenkopp ............ H02K 1/185
                                                    310/216.049
2016/0285324 A1\* 9/2016 Carrasco ................... H02K 5/04
2016/0285342 A1\* 9/2016 Carrasco ................ H02K 1/185

\* cited by examiner

STATOR ASSEMBLY AND MAGNETIC BEARING OR ELECTRIC MOTOR HAVING SUCH A STATOR ASSEMBLY

CROSS REFERENCE TO RELATED APPLICATION

This application claims priority to European patent application no. 15305446.5 filed on Mar. 26, 2015, the contents of which are fully incorporated herein by reference.

TECHNICAL FIELD OF THE INVENTION

The present invention concerns a stator assembly comprising a housing and a stator. The invention also concerns a magnetic bearing or an electric motor comprising such a stator assembly.

BACKGROUND OF THE INVENTION

The motor stators or the magnetic actuators for magnetic bearings cannot always be centered and fastened to their housing using fasteners such as screws or rivets. To reduce the size of the assembly or to facilitate its manufacturing, the stators are often shrink fitted to their housings. A shrinkage interference of the diameters of the stator and the housing must be computed relative to the size of the parts or the environmental conditions of the assembly on the basis of the thermal elongation of the materials used.

Currently the shrinkage of two assemblies or of an assembly into its housing is done by thermal expansion. The external assembly or the housing is heated to a certain temperature to obtain an expansion bigger than the shrinkage value, allowing a free insertion of the inner assembly, and then the two parts are cooled to the same temperature to obtain the shrinkage.

This current method requires a heater which needs to be in accordance to the size of the parts to be heated and high precision during the insertion to prevent a partial shrinkage. When the parts get stuck at a wrong position, the assembly is lost, since the only way to recover some parts is to destroy the assembly. The final position of an assembly of this kind is often fixed by a shoulder that gives the final position and no adjustment is possible.

SUMMARY OF THE INVENTION

The aim of the invention is to provide a new stator assembly in which the stator is fastened to the housing with simpler means than with shrinkage techniques.

To this end, the invention concerns a stator assembly comprising a housing and a stator which are concentric, the stator being mounted radially inside the housing, the housing having an inner surface and the stator having an outer surface which radially faces the inner surface of the housing. This stator assembly is characterized in that one of the outer surface of the stator and the inner surface of the housing has recessed shapes and the other one of the outer surface of the stator and the inner surface of the housing has protruding shapes, and in that the recessed shapes and the protruding shapes are arranged so that:
  in a first relative position of the housing and the stator, the protruding shapes are inserted in the recessed shapes so that the stator can be mounted radially inside the housing along a central axis of the assembly,
  in a second relative position of the housing and the stator, which is angularly shifted relative to the first position around the central axis, the protruding shapes exert, against the one of the housing and the stator which bears the recessed shapes, a radial force which angularly and axially locks the stator with respect to the housing.

Thanks to the invention, the fastening of the stator on the housing is obtained with simple and less costly means. As there is no use of heating of the complete housing, the positioning of the stator in the housing can be more accurately obtained, since there is no need to quickly assemble the housing around the stator because of the spontaneous cooling down of the housing at ambient temperature.

According to further aspects of the invention which are advantageous but not compulsory, such a stator assembly may incorporate one or several of the following features:
  The minimal diameter of the inner surface of the housing is inferior to the maximal diameter of the outer surface of the stator.
  The stator assembly comprises four protruding shapes adapted to be inserted into four recessed shapes.
  The recessed shapes are provided on the inner surface of the housing while the protruding shapes are provided on the outer surface of the stator.
  The recessed shapes of the inner surface of the housing are formed by recesses having a cylindrical shape.
  The inner surface of the housing has an octagonal shape in transversal section, whereas the recessed shapes of the inner surface of the housing are formed by angles of the octagonal shape.
  The protruding shapes of the outer surface of the stator are formed by bosses.
  The protruding shapes of the outer surface of the stator are formed by rollers rotatable with respect to the stator around axes parallel to the central axis of the assembly.
  The stator is made or four separate parts, whereas the rollers are mounted in cylindrical holes provided at the interfaces of the four separate parts of the stator.
  The recessed shapes are provided on the outer surface of the stator while the protruding shapes are provided on the inner surface of the housing.
  The protruding shapes of the inner surface of the housing are formed by bosses.
  The recessed shapes of the outer surface of the stator are formed by recesses having a cylindrical shape.
  The recessed shapes of the outer surface are provided on both sides of rollers provided on the stator and rotatable with respect to the stator around axes parallel to the central axis of the assembly, whereas in the second relative position of the stator and the housing, the protruding shapes of the inner surface of the housing exert the radial force against the rollers.
  The stator is made or four separate parts, whereas the rollers are mounted in cylindrical holes provided at the interfaces of the four separate parts of the stator.

The invention also relates to a magnetic bearing or an electric motor comprising a stator assembly as mentioned here-above.

BRIEF DESCRIPTION OF THE DRAWINGS

The invention will now be explained in correspondence with the annexed figures, as an illustrative example. In the annexed figures.

DETAILED DESCRIPTION OF SOME EMBODIMENTS

Figure 1:
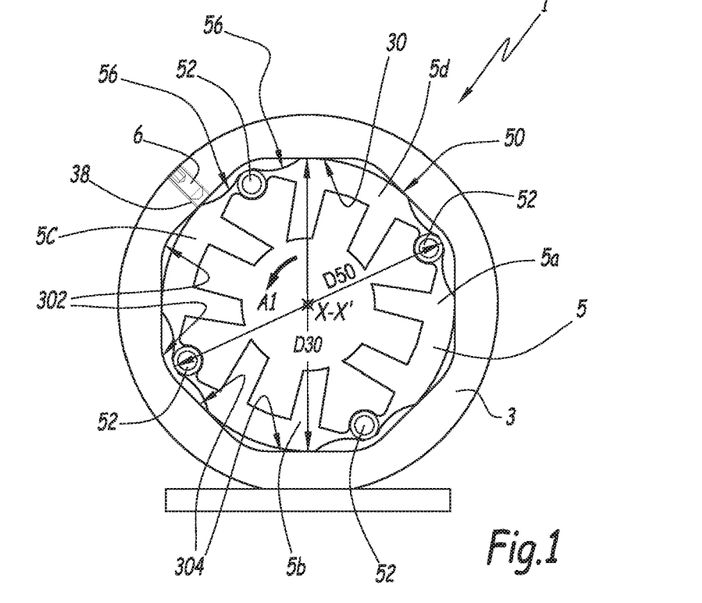
FIG. 1 is a front view of a stator assembly according to a first embodiment of the invention, in a first configuration.
Figure 2:
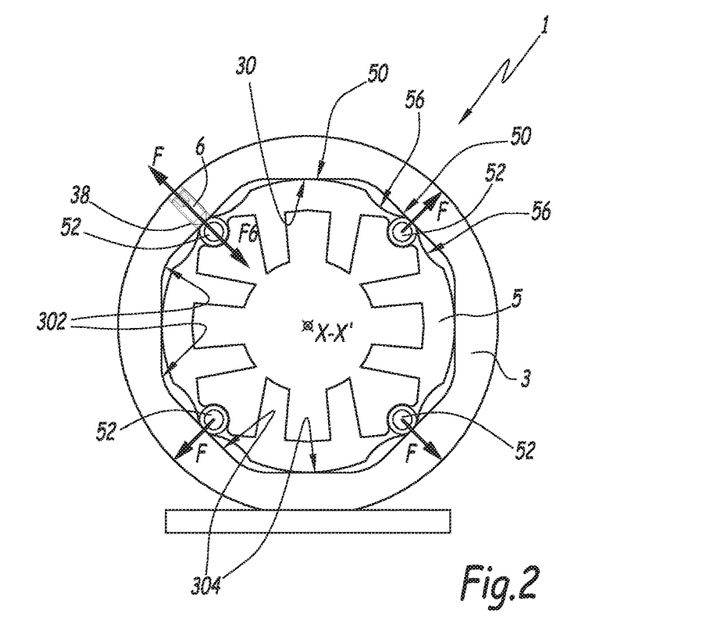
FIG. 2 is a view similar to FIG. 1, in a second configuration.

A stator assembly 1 is represented in FIGS. 1 and 2. The stator assembly 1 comprises a housing 3 and a stator 5, which are concentric and centered on a central axis X-X'. The stator 5 is mounted radially inside the housing 3. The housing 3 bears an inner surface 30 and the stator 5 bears an outer surface 50 which radially faces the inner surface 30 of the housing 3.

The stator 5 can be made of magnetized laminations of a metallic material. The stator is made or four separate parts 5a, 5b, 5c and 5d.

The stator assembly 1 may belong, for example, to an electrical motor or to a magnetic bearing.

In order to fasten the housing 3 and the stator 5 together, according to the invention, one of the outer surface 50 and the inner surface 30 has recessed shapes, and the other one of the outer surface 50 and the inner surface 30 has protruding shapes. In the embodiment of FIGS. 1 and 2, the recessed shapes are provided on the inner surface 30, while the protruding shapes are provided on the outer surface 50.

The inner surface 30 has an octagonal shape in transversal section, and the recessed shapes of the inner surface 30 are formed by angles 302 of the octagonal shape.

The protruding shapes of the outer surface 50 are formed by four rollers 52 mounted in the stator 5 and rotatable with respect to the stator 5 around rotation axes parallel to the central axis X-X'. The stator assembly 1 is preferably provided with four rollers 52. As a non-shown variant, the stator assembly 1 may comprise more than four rollers 52.

In the embodiment of FIGS. 1 and 2, the stator 5 is made of four separate parts 5a, 5b, 5c and 5d. The rollers 52 are mounted in cylindrical holes provided at the interfaces of the four separate parts 5a, 5b, 5c and 5d.

The angles 302 and the rollers 52 are arranged so that in a first relative position of the housing 3 and the stator 5, represented on FIG. 1, the rollers 52 are inserted in the angles 302. In this position which corresponds to an insertion configuration, the stator 5 can be freely mounted radially inside the housing 3 along the central axis X-X'.

In a second relative position of the housing 3 and the stator 5, represented on FIG. 2 and which is angularly shifted relative to the first position around the central axis X-X', the rollers 52 are in contact with planar portions 304 of the inner surface 30 which extends between the angles 302. In this position which corresponds to a locking configuration, the rollers 52 exert, against the inner surface 30, a radial force F which angularly and axially locks the stator 5 with respect to the housing 3.

In order to obtain this radial force F, the minimal diameter D30 of the inner surface 30 which corresponds to the distance between the center of the planar portions 304 to the axis X-X', is inferior to the maximal diameter D50 of the outer surface 50, which corresponds to the largest distance between the rollers 52 and the axis X-X'.

When an operator manufactures the stator assembly 1, he has to position the separate housing 3 and stator 5 with respect to each other so that the rollers 52 can be inserted in the angles 302 when the stator 5 is mounted in the housing along the central axis X-X', as shown on FIG. 1. When this step is performed, the operator only needs to rotate the housing 3 with respect to the stator 5, or vice-versa, around the central axis X-X' as shown by arrow A1 on FIG. 1, to obtain the fastening of the stator assembly 1, as shown on FIG. 2.

As an optional feature, the stator assembly 1 comprises at least one screw 6 for locking the angular position of the stator 5 with respect to the housing 3. In the represented example, the stator assembly 1 comprises one screw 6 which is inserted into a threaded bore 38 of the housing 3 in a centripetal direction relative to the central axis X-X'. The screw 6 exerts a radial force F6 against the radial outer surface 50.

Other embodiments of the invention are represented on FIGS. 3 to 12. In these embodiments, elements common to the first embodiment have the same reference and work in the same way. Only the differences with respect to the first embodiment are detailed hereafter.

Figure 3:
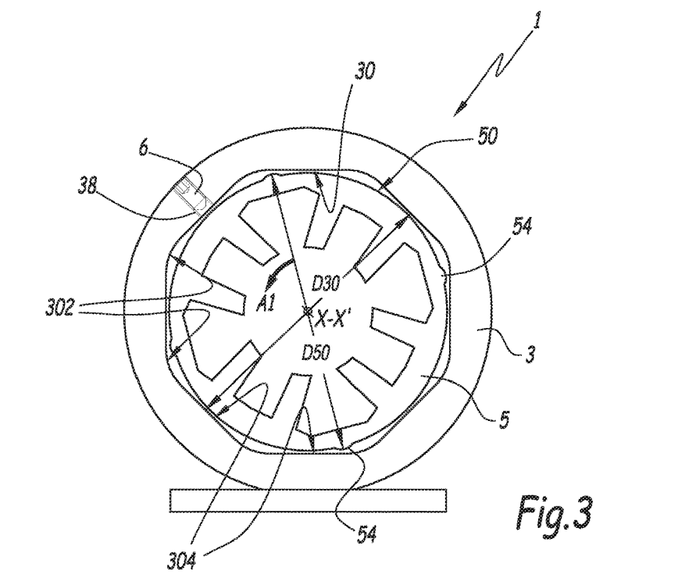
FIGS. 3 and 4, 5 and 6, 7 and 8, 9 and 10, 11 and 12 are respective front views of stator assemblies according to five other embodiments of the invention, in the configurations of FIGS. 1 and 2.
Figure 4:
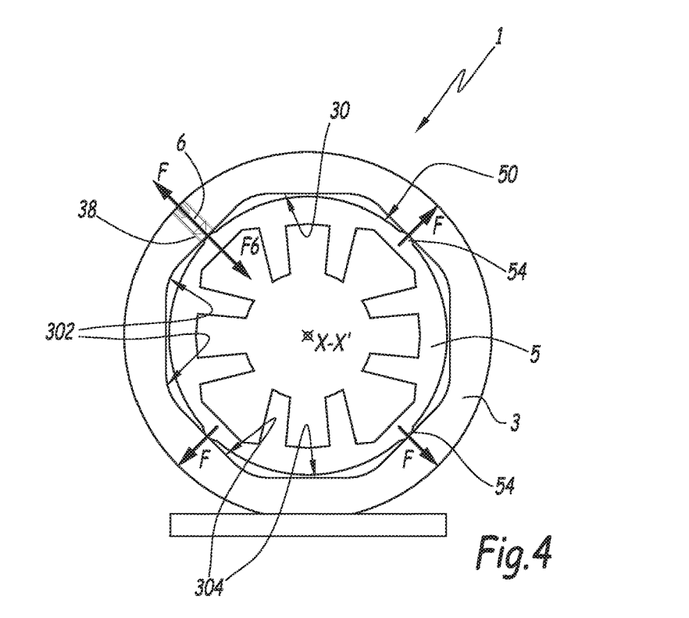

In the embodiment of FIGS. 3 and 4, the stator 5 is made of a unique monolithic part. The protruding shapes of the outer surface 50 of the stator 5 are formed by bosses 54. In the insertion configuration represented on FIG. 3, the bosses 54 are inserted in the angles 302. In the locking configuration represented on FIG. 4, the bosses 54 are in contact with the planar portions 304, so that the housing 3 and the stator 5 are fastened together.

Figure 5:
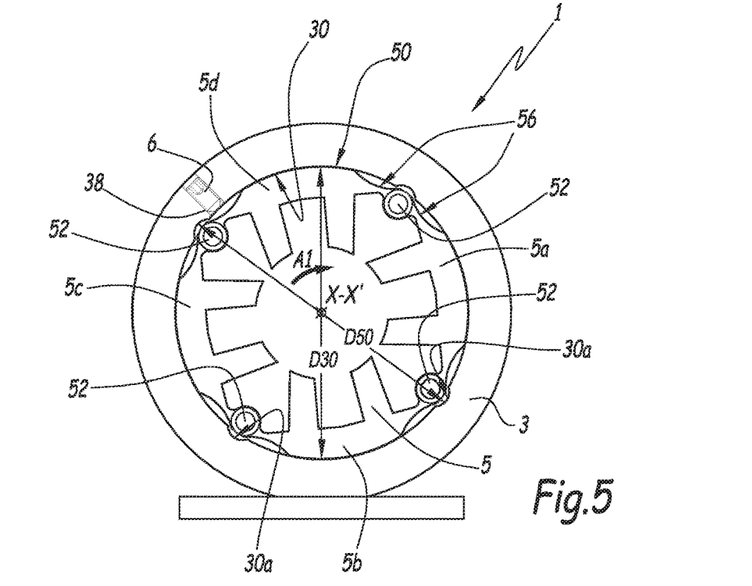
Figure 6:
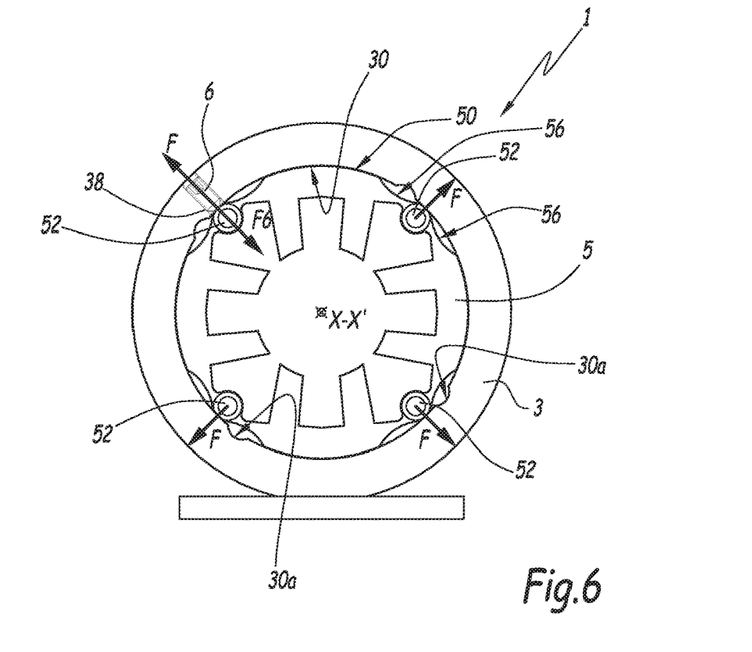

The embodiment of FIGS. 5 and 6 differs from the embodiment of FIGS. 1 and 2 by the fact that the inner surface 30 does not have a transversal octagonal shape, and the recessed shapes of the inner surface 30 are formed by recesses 30a having a cylindrical shape. In the insertion configuration represented on FIG. 5, the rollers 52 are inserted in the recesses 30a. In the locking configuration represented on FIG. 6, the rollers 52 are in contact with the portion of the inner surface 30 where the recesses 30a are not provided, and whose diameter D30 is inferior to the maximal diameter D50.

Figure 7:
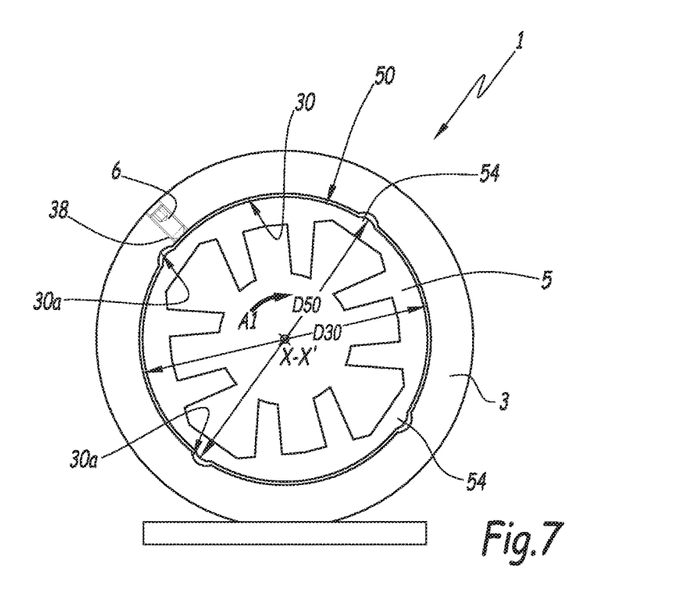
Figure 8:
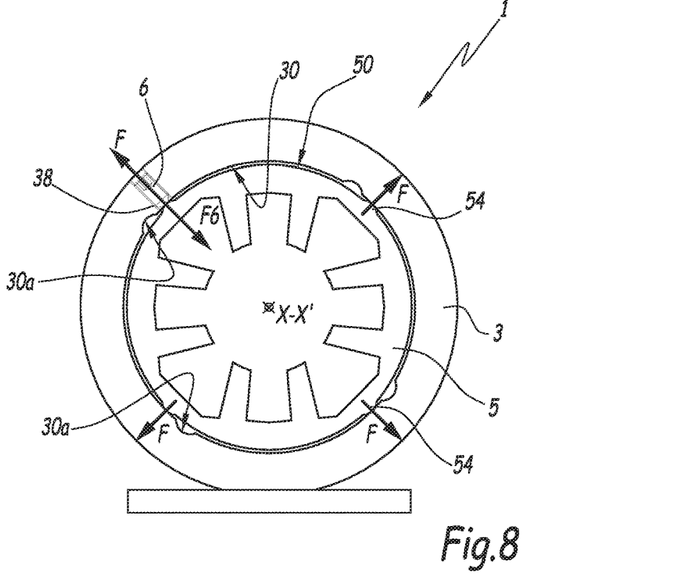

The embodiment of FIGS. 7 and 8 is a combination of the embodiment of FIGS. 3 and 4 and the embodiment of FIGS. 5 and 6. In this embodiment, the recessed shapes of the inner surface 30 are formed by the recesses 30a, while the stator 5 is formed by a unique monolithic part and the protruding shapes of the outer surface 50 are formed by the bosses 54.

Figure 9:
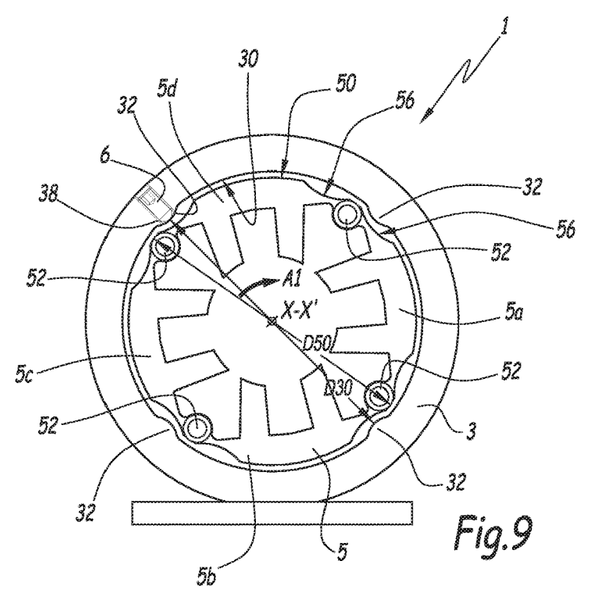
Figure 10:
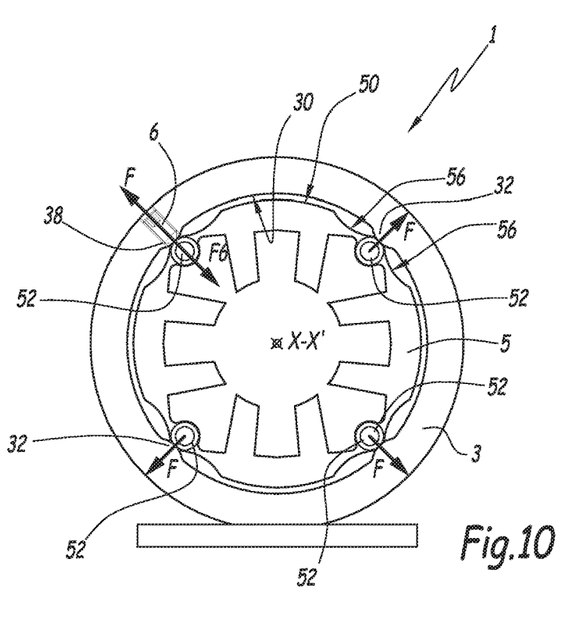

In the embodiment of FIGS. 9 and 10, the recessed shapes are provided on the outer surface 50, while the protruding shapes are provided on the inner surface 30. In this embodiment, the protruding shapes of the inner surface 30 are formed by bosses 32 having a cylindrical shape. The stator 5 has substantially the same structure as in the embodiment of FIGS. 1 and 2. The recessed shapes of the outer surface 50 are formed by recesses 56 provided on both sides of the rollers 52.

In the insertion configuration represented on FIG. 9, the bosses 32 are inserted in the recesses 56. In the locking configuration represented on FIG. 10, the bosses 32 are in contact with the rollers 52, so that the assembly 1 is locked.

Figure 11:
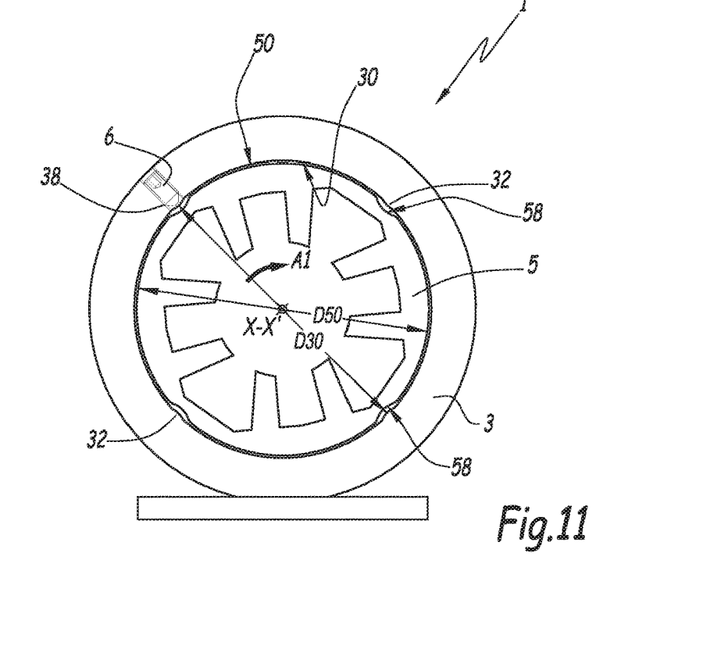
Figure 12:
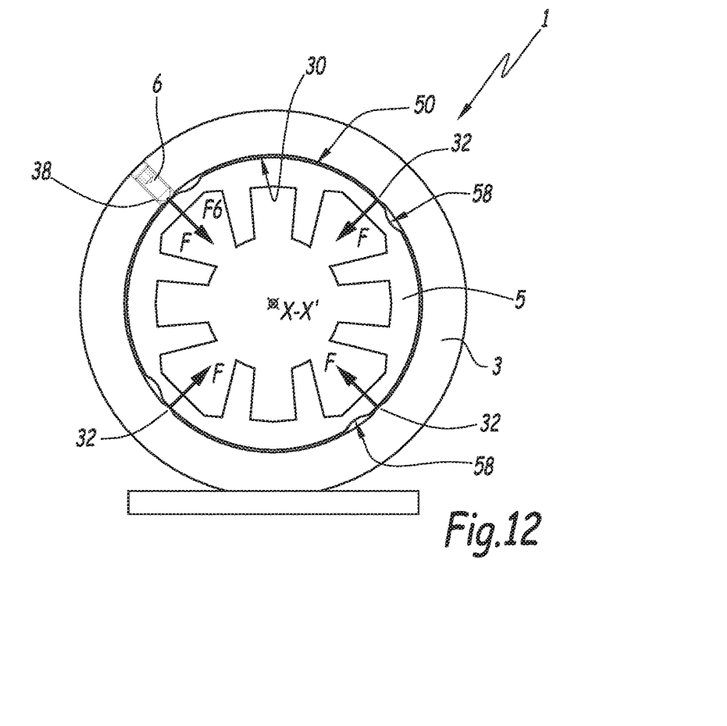

The embodiment of FIGS. 11 and 12 differs from the embodiment of FIGS. 9 and 10 by the fact that the stator 5 is made of a unique monolithic part. The recessed shapes of the outer surface 50 are formed by recesses 58 having a cylindrical shape.

In the insertion configuration represented on FIG. 11, the bosses 32 are inserted in the recesses 58. In the locking configuration represented on FIG. 12, the bosses 32 are in contact with the portions of the outer surface 50 where the recesses 58 are not provided, and which has a maximal diameter D50 superior to the minimal diameter D30 of the inner surface 30.

The technical features of the above mentioned embodiments and variants can be combined to form new embodiments of the invention.

The invention claimed is:

1. A stator assembly comprising:
a housing and a stator that are concentric, the stator mounted radially inside the housing, the housing having an inner surface and the stator having an outer surface that radially faces the inner surface of the housing, wherein one of the outer surface of the stator and the inner surface of the housing has recessed shapes and the other one of the outer surface of the stator and the inner surface of the housing has protruding shapes, and wherein the recessed shapes and the protruding shapes are arranged so that:
in a first relative position of the housing and the stator, the protruding shapes are inserted in the recessed shapes so that the stator can be mounted radially inside the housing along a central axis of the assembly, and
in a second relative position of the housing and the stator, which is angularly shifted relative to the first position around the central axis, the protruding shapes exert, against the one of the housing and the stator that bears the recessed shapes, a radial force which angularly and axially locks the stator with respect to the housing,
wherein the recessed shapes are provided on the inner surface of the housing while the protruding shapes are provided on the outer surface of the stator,
wherein the protruding shapes of the outer surface of the stator are formed by rollers rotatable with respect to the stator around axes parallel to the central axis of the assembly.

2. The stator assembly according to claim 1, wherein the minimal diameter of the inner surface of the housing is less than the maximal diameter of the outer surface of the stator.

3. The stator assembly according to claim 1, further comprising four protruding shapes adapted to be inserted into four recessed shapes.

4. The stator assembly according to claim 1, wherein the recessed shapes of the inner surface of the housing are formed by recesses having a semi-cylindrical shape.

5. The stator assembly according to claim 1, wherein the inner surface of the housing has an octagonal shape in transversal section, and wherein the recessed shapes of the inner surface of the housing are formed by angles of the octagonal shape.

6. The stator assembly according to claim 1, wherein the stator is made or four separate parts, and wherein the rollers are mounted in cylindrical holes provided at the interfaces of the four separate parts of the stator.

7. The stator assembly according to claim 1, wherein the recessed shapes are provided on the outer surface of the stator while the protruding shapes are provided on the inner surface of the housing.

8. The stator assembly according to claim 7, wherein the protruding shapes of the inner surface of the housing are formed by bosses.

9. The stator assembly according to claim 7, wherein the recessed shapes of the outer surface of the stator are formed by recesses having a cylindrical shape.

10. The stator assembly according to claim 7, wherein the recessed shapes of the outer surface (50) are provided on both sides of rollers disposed on the stator and rotatable with respect to the stator around axes parallel to the central axis of the assembly, and wherein in the second relative position of the stator and the housing, the protruding shapes of the inner surface of the housing exert the radial force against the rollers.

11. The stator assembly according to claim 10, wherein the stator is made or four separate parts, and wherein the rollers are mounted in cylindrical holes provided at the interfaces of the four separate parts of the stator.

12. A magnetic bearing including a stator, the stator comprising:
a stator assembly having a housing and a stator that are concentric, the stator mounted radially inside the housing, the housing having an inner surface and the stator having an outer surface that radially faces the inner surface of the housing, wherein one of the outer surface of the stator and the inner surface of the housing has recessed shapes and the other one of the outer surface of the stator and the inner surface of the housing has protruding shapes, and wherein the recessed shapes and the protruding shapes are arranged so that:
in a first relative position of the housing and the stator, the protruding shapes are inserted in the recessed shapes so that the stator can be mounted radially inside the housing along a central axis of the assembly, and
in a second relative position of the housing and the stator, which is angularly shifted relative to the first position around the central axis, the protruding shapes exert, against the one of the housing and the stator that bears the recessed shapes, a radial force which angularly and axially locks the stator with respect to the housing,
wherein the recessed shapes are provided on the inner surface of the housing while the protruding shapes are provided on the outer surface of the stator,
wherein the protruding shapes of the outer surface of the stator are formed by rollers rotatable with respect to the stator around axes parallel to the central axis of the assembly.

13. An electric motor including a stator, the stator comprising:
a stator assembly having a housing and a stator that are concentric, the stator mounted radially inside the housing, the housing having an inner surface and the stator having an outer surface that radially faces the inner surface of the housing, wherein one of the outer surface of the stator and the inner surface of the housing has recessed shapes and the other one of the outer surface of the stator and the inner surface of the housing has protruding shapes, and wherein the recessed shapes and the protruding shapes are arranged so that:
in a first relative position of the housing and the stator, the protruding shapes are inserted in the recessed shapes so that the stator can be mounted radially inside the housing along a central axis of the assembly, and
in a second relative position of the housing and the stator, which is angularly shifted relative to the first position around the central axis, the protruding shapes exert, against the one of the housing and the stator that bears the recessed shapes, a radial force which angularly and axially locks the stator with respect to the housing,
wherein the recessed shapes are provided on the inner surface of the housing while the protruding shapes are provided on the outer surface of the stator,
wherein the protruding shapes of the outer surface of the stator are formed by rollers rotatable with respect to the stator around axes parallel to the central axis of the assembly.

* * * * *